United States Patent

[11] 3,614,708

| [72] | Inventor | William S. Koepfgen<br>Southgate, Mich. |
|---|---|---|
| [21] | Appl. No. | 848,850 |
| [22] | Filed | Sept. 11, 1969 |
| [45] | Patented | Oct. 19, 1971 |
| [73] | Assignee | Ekstrom Industries, Inc.<br>Farmington, Mich. |

[54] METER DISCONNECT DEVICE
7 Claims, 5 Drawing Figs.

[52] U.S. Cl..................................... 339/36,
174/138 F, 174/138 G, 200/158, 317/107
[51] Int. Cl..................................... H01r 13/44,
H01r 13/60
[50] Field of Search............................ 339/34, 36,
38; 174/138.4; 324/76, 149; 200/52, 61, 19, 158;
220/24–25, 3.2–3.94; 317/107, 109, 111

[56] References Cited
UNITED STATES PATENTS

| 2,643,362 | 6/1953 | Johansson.................. | 339/36 |
| 2,932,811 | 4/1960 | Abraham et al............. | 339/38 |
| 2,172,218 | 9/1939 | Mylius...................... | 317/107 X |

FOREIGN PATENTS

| 816,309 | 6/1969 | Canada...................... | 339/36 |
| 57,888 | 9/1967 | Germany..................... | 339/38 |
| M20,653 | 11/1953 | Germany..................... | 339/38 |

*Primary Examiner*—Marvin A. Champion
*Assistant Examiner*—Terrell P. Lewis
*Attorney*—James P. Meloche ABSTRACT: A unitary insulating plastic disconnect device designed to plug into both line jaws of a common household watthour meter socket; said device being provided with a slot capable of holding a meter by one blade and in a disconnected condition by reason of being rotated out of contact with said meter socket jaws.

INVENTOR.
William S. Koeptgen
BY James P. Melche
ATTORNEY.

METER DISCONNECT DEVICE

BACKGROUND OF THE INVENTION

This invention relates to the field of devices for mounting watthour meters or other electrical instrumentalities and is concerned more particularly with a mounting of an instrumentality housed in the type of casing used for watthour meters of the so-called socket type when the instrumentality is to remain mounted and in a disconnected position.

The invention has particular application to detachable or socket-type watthour meter assemblies which include a meter socket or terminal base, containing jaws and a meter carrying terminal blades adapted to fit in the jaws when the meter is plugged into the meter socket. Such meter assemblies are commonly designed for installation between public utility power lines and a household electrical circuit and when service to a particular household is to be disconnected it is often desirable that the meter be left in the assembly for future reconnection.

Heretofore internal switch devices have been used to provide a disconnect but such devices have proved too costly for wide application. Also, a plastic sleeve has been placed over the blades to insulate them from the jaws when the blade is inserted into the jaw but this device leaves no visible indication that the meter is disconnected.

BRIEF SUMMARY OF THE INVENTION

The present invention provides a rugged device of high dielectric strength adapted to be inserted into the line jaws of the meter socket. The device is further provided with a slot to hold a meter blade in a position rotated out of alignment with the jaws thereby providing a mounting for meter in a disconnected position. Metermen may quickly spot this disconnect because the meter is in a rotated position. The device is further provided with an insulating skirt to provide a meter jaw safety shield.

The disconnect device of my invention is illustrated as a typical embodiment in the accompanying drawings in which:

FIG. 4 is an exploded view showing the meter socket and the meter with the disconnect device of this invention there between;

Figure 1:
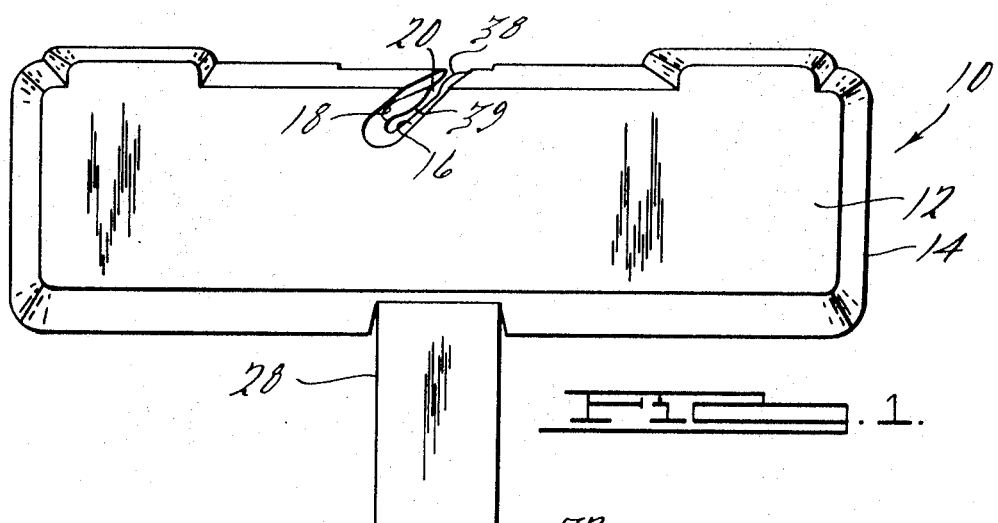
FIG. 1 is a top view of the disconnect device of this invention.
Figure 2:
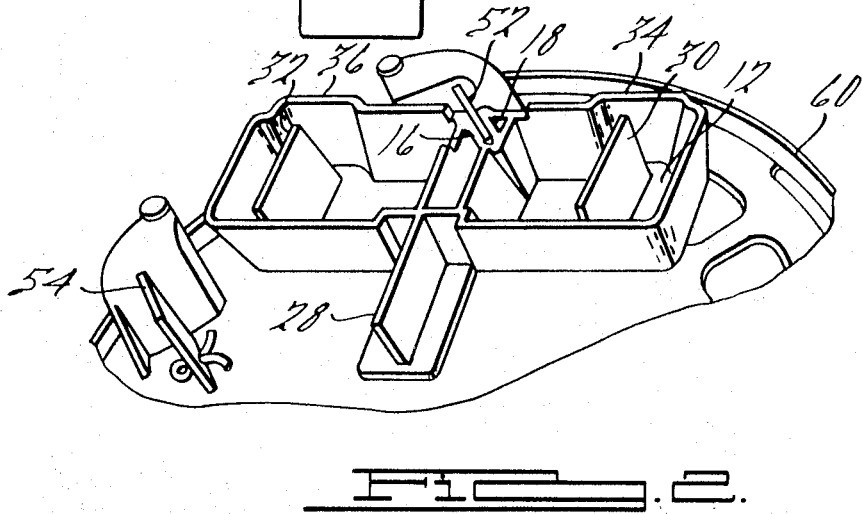
FIG. 2 is an oblique bottom view of the disconnect device of FIG. 1, as mounted on a meter blade.
Figure 3:
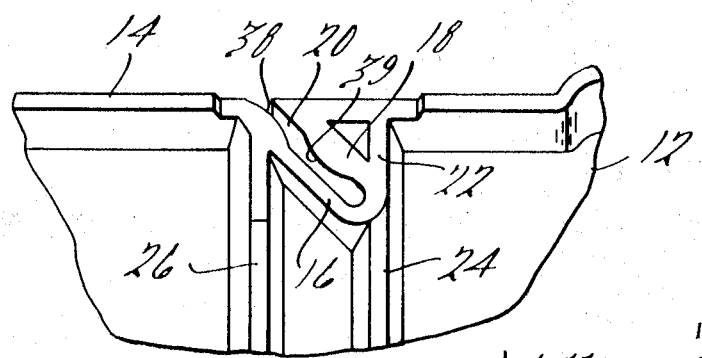
FIG. 3 is a partial bottom view of the disconnect device of FIG. 1, to show details of the meter blade slot.

The disconnect device, 10, as viewed in FIGS. 1–3, is a molded unitary body of rugged plastic material of high dielectric strength. The form illustrated, herein, is provided with a base, 12, seen to be a flat planar wall which, around its periphery, is integral with a shaped skirt, 14, and slot walls, 16 and 18, that define slot, 20. Suitable support ribs, 22,24,26, joining the base, 12, and walls, 14, 16, and 18, may be provided to strengthen the device as shown in FIGS. 2–3. A handle, 28, in the shape of an extruded T is also joined to base, 12, and skirt, 14.

A pair of prongs, 30, 32, are integral with base, 12, on one side and extend out from the bottom of base 12, and are designed to be insertable in the line jaws of a meter socket in the same manner as meter blades. Skirt, 14, is shown to be spaced from prongs, 30, 32, by providing skirt, 14, with set out sections, 34, 36, and such set out sections may be provided on both sides or either side of each prong, 30, 32. Considering the top of FIG. 1, as the top, then wall, 16, which is essentially normal to base, 12, and disposed 45° to the vertical centerline of base, 12, joins wall, 18, in a curved manner to form a U-shaped slot, 20. Wall, 16, may be disposed within the range from 39° to 50° to the vertical centerline of base, 12. A tapering lock protrusion, 38, on wall, 16, in the shape of a partial vertical section of a cone has its base on the bottom of wall, 16. Walls, 16 and 18, are set at a slight angle to provide slot, 20, with a top wider than its bottom. Interference protrusion, 39, on wall, 18, may be provided as a simple means to regulate the best slot width for use on meter blades.

Figure 4:
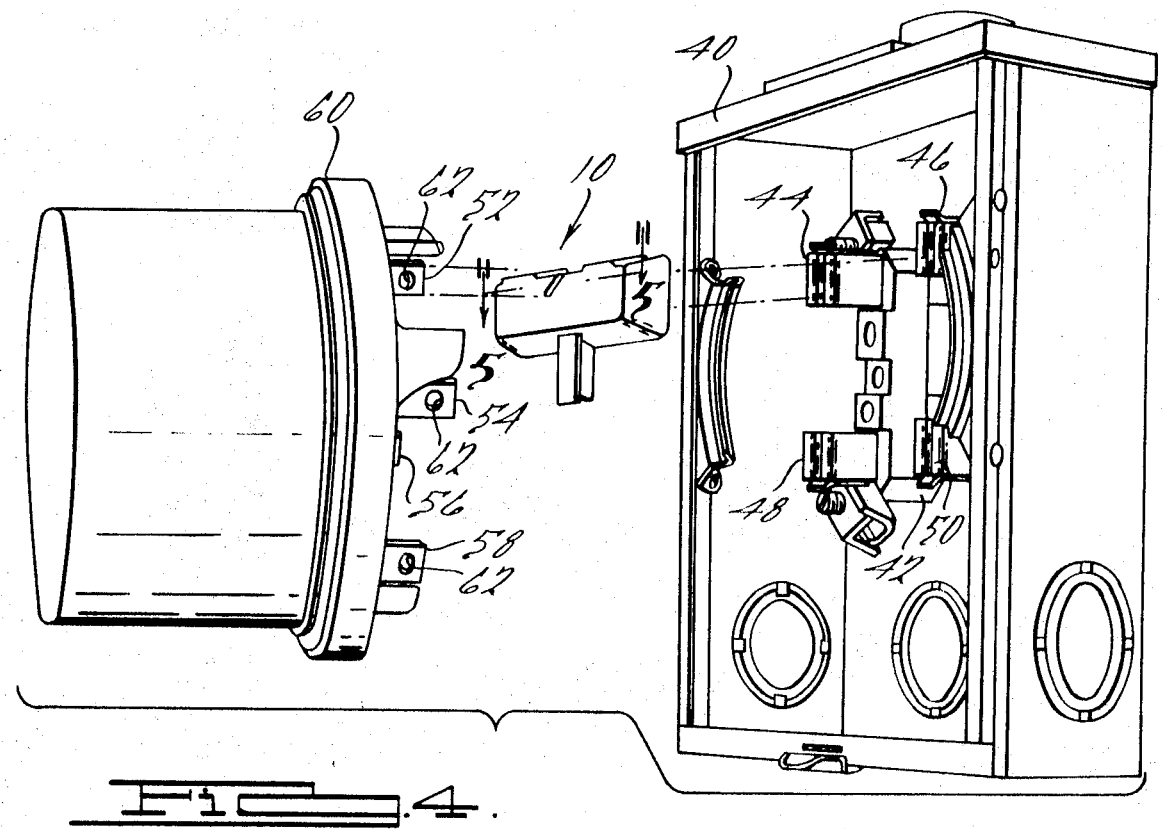

FIG. 4 is an exploded view of the essential parts that are representative of the type of household electric watthour service meter installations found in common use to illustrate the use of disconnect device, 10. A meter box, 40, secured upright on the premises being supplied with electricity, carries a meter socket, 42, provided with line jaws, 44 and 46, and load jaws, 48 and 50, that are designed to receive respective line blades, 52 and 54, and load blades, 56 and 58, of meter, 60, when the meter, 60, is inserted into box, 40, in the normal connected position. The load and line wires and the cover and ring seal to box, 40, are not illustrated since they are well known to those skilled in the art. Blades, 52, 54, 56, and 58, are each provided with a bore, 62.

When a meterman desires to disconnect the meter, 60, he removes the usual seal and retaining cover of box, 40, and pulls out meter, 60. Disconnect device, 10, is then snapped onto blade, 52, at slot, 20, as shown in FIG. 2, and protrusion, 38, detents into bore, 62. The meter, 60, held at a 45° rotated position is now pushed back into box, 40, and the prongs, 30 and 32, enter jaws, 44 and 46, respectively, and are securely seated therein so that meter socket, 42, supports the disconnect device, 10, which completely supports meter, 60, while the seal and retaining cover are reinstalled. An alternative method of installation would be to first install the disconnect device, 10, on the line side meter socket jaws, 44 46, and then rotate the meter 45° and insert the top left meter blade, 52, into the retaining slot, 20, followed by resealing the meter installations in the usual manner. The disconnect device, 10, is withdrawn from jaws, 44 and 46, automatically when the meter, 60, is removed because protrusion 38, sufficiently interferes with the backward movement of bore, 62, in slot, 20. Safety handle, 28, is provided if disconnect device, 10, is to be removed by hand from the line jaws, 44 and 46, as in those instances when it is used only as a safety shield.

Figure 5:
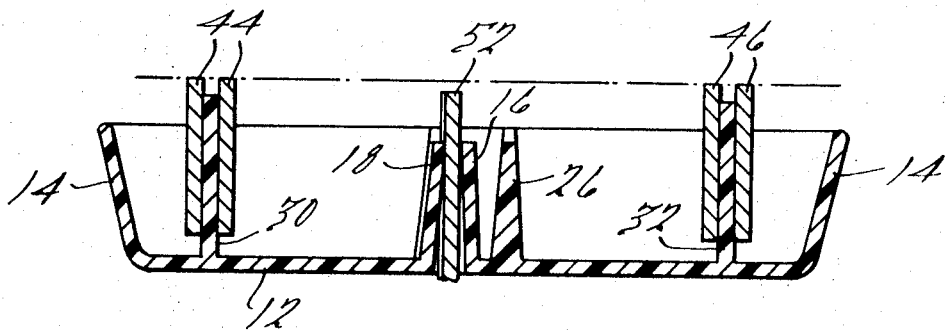
FIG. 5 is horizontal section 5—5 of the disconnect device in FIG. 4 as it would be inserted in the jaws and carrying the meter blade.

FIG. 5 is a horizontal section 5—5 taken through inserted disconnect device, 10, of FIG. 4 to show the assembled relationship of the parts. Prongs, 30 and 32, are engaged in jaws, 44 and 46, which base, 12, and skirt, 14, are shielding. Blade, 52, is secured between walls, 16 and 18, and the meter is therefore supported in a safe disconnected position.

The meter, 60, in FIG. 4, therefore remains essentially coaxial and coplanar when in the inserted disconnect position with the axis and plane it occupies when in the connected position however the disconnected meter is rotated from the normal connected position to an angle that allows the coplanarity without interference from jaws or other parts in the box, 40.

Having thus described an embodiment of my invention there will be modifications readily apparent to those skilled in the art and I therefore desire to limited only by the appended claims.

I claim:

1. In the art of detachable electric meters of the type comprising a meter carrying a contact blade and a meter terminal socket carrying contact jaws adapted to receive the blade, a detachable device for insulating the blade from the jaws, comprising:

a base having one dimension of sufficient length to span the distance between two jaws;

prongs, connected to said base, for inserting into said jaws to detachably hold said base adjacent said jaws;

walls, connected to said base, and defining a slot of varying width, for detachably holding a blade and thereby the meter in a position out of contact with said jaws and axially rotated but essentially coaxial and coplanar with the normal meter position when the blades are received in the jaws;

and insulating surfaces on all of said device.

2. In the art of detachable electric meters of the type comprising a meter carrying a contact blade and a meter terminal socket-carrying contact jaws adapted to receive the blade, a detachable device for insulating the blade from the jaws, comprising:

the detachable device of claim 1 further including a skirt, connected to said base, for shielding said jaws.

3. In the art of detachable electric meters of the type comprising a meter carrying a contact blade and a meter terminal socket-carrying contact jaws adapted to receive the blade, a detachable device for insulating the blade from the jaws, comprising:

the detachable device of claim 1, further including,
a handle, connected to said base, and disposed away from said supports to facilitate the safe detaching by hand of said device from said jaws.

4. In the art of detachable electric meters of the type comprising a meter carrying a contact blade and a meter terminal socket-carrying contact jaws adapted to receive the blade, a detachable device for insulating the blade from the jaws, comprising:

the detachable device of claim 1, further including, a protrusion, extending from at least one of said walls defining a slot, for interferring with the removal of said blade after it is inserted in said slot.

5. In the art of detachable electric meters of the type comprising a meter carrying a contact blade and a meter terminal socket-carrying contact jaws adapted to receive the blade, a detachable device for insulating the blade from the jaws, comprising:

the detachable device of claim 1, further including,
a protrusion, extending from at least one of said walls defining a slot, for interferring with the removal of said blade after it is inserted in said slot, wherein, said protrusion is shaped in the form of a vertical section of a cone.

6. In the art of detachable electric meters of the type comprising a meter carrying a contact blade and a meter terminal socket-carrying contact jaws adapted to receive the blade, a detachable device for insulating the blade from the jaws, comprising:

the detachable device of claim 1, wherein said walls, defining a slot, are disposed to hold said blade at a 45° angle to said normal blade position, and further including:
a protrusion, extending from at least one of said walls defining a slot, for interferring with the removal of said blade after it is inserted in said slot.

7. In the art of detachable electric meters of the type comprising a meter carrying a contact blade and a meter terminal socket-carrying contact jaws adapted to receive the blade, a detachable device for insulating the blade from the jaws, comprising:

the detachable device of claim 1, wherein
said walls, defining a slot, are disposed to hold said blade at an angle to said normal blade position and said angle is within the range between 39° and 50°, inclusive.